(No Model.)
S. H. CHASE.
DEVICE FOR DRESSING SAW TEETH.
No. 272,530. Patented Feb. 20, 1883.
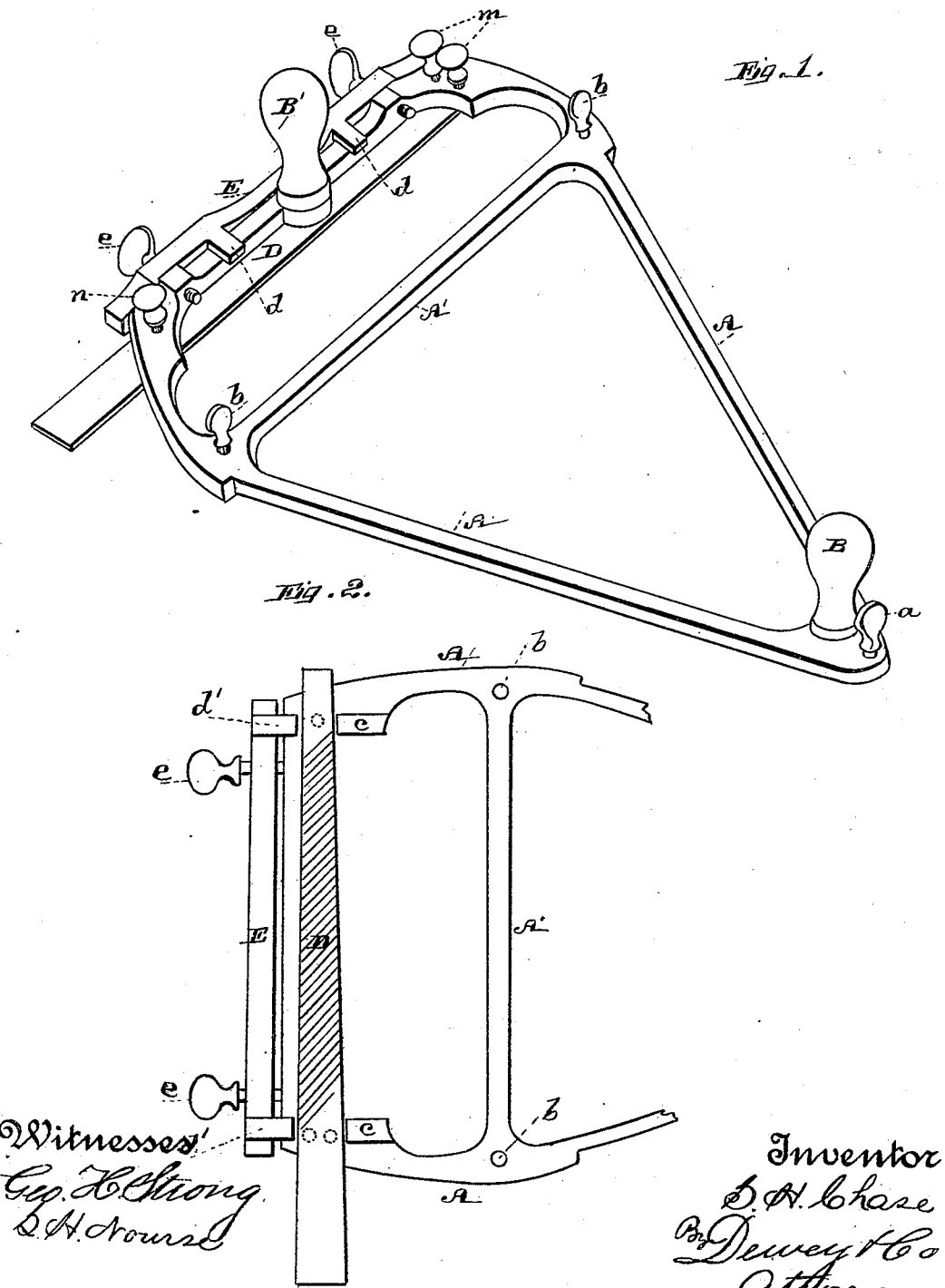

UNITED STATES PATENT OFFICE.

STEPHEN H. CHASE, OF SAN JOSÉ, CALIFORNIA.

DEVICE FOR DRESSING SAW-TEETH.

SPECIFICATION forming part of Letters Patent No. 272,530, dated February 20, 1883.

Application filed May 2, 1882. (No model.)

*To all whom it may concern:*

Be it known that I, STEPHEN H. CHASE, of San José, county of Santa Clara, State of California, have invented an Improvement in Jointers for Circular Saws; and I hereby declare the following to be a full, clear, and exact description thereof.

My invention relates to a novel device for jointing circular saws, and more especially to a tool which is adapted to joint or dress the sides of the teeth.

My invention consists in certain details of construction, as hereinafter fully described, and specifically pointed out in the claims.

The object of my invention is to provide a device for dressing or jointing the sides of the teeth of a circular saw, after they have been swaged, to bring them into line with one another and cause them to cut clean.

Referring to the accompanying drawings, Figure 1 is a perspective view of my device. Fig. 2 is a view of the under side.

Let A represent the frame, preferably constructed of metal. Its sides converge toward one end, its other end being wide, as shown. Upon the small end is a handle or knob, B, and about the center of the wide end is a similar handle, B'. In the small end of the frame, behind the handle B, is a thumb-screw, $a$, which passes through the frame and is adapted to project upon the other side. In the sides of the frame, at about the ends of the cross-bar A', are the thumb-screws $b$, which project through to the other side. Upon the under or inner side of the frame are cast projections $c$, forming shoulders, against which the file D, which extends across the wide end, under the frame, rests.

E represents the clamp. This consists of a bar lying along the front of the wide head or end of frame A. It has projecting arms or guides $d$ upon its upper side, lying upon top of the frame, and similar ones, $d'$, upon its under side, near its ends, passing under the frame and abutting against the file D. Thumb-screws $e$ adjust the clamp to press its arms $d'$ against the file and secure it between themselves and the projections $c$.

Upon the upper side of the frame are the thumb-screws $m$, passing through and impinging against the file near one end, and a similar screw, $n$, passes through the frame and presses against the file at the center of its other end.

The operation of the machine is as follows: Suppose the saw to be properly secured in a vertical position. I take hold of the machine by its handles, and, holding its small end firmly against the side of the saw-plate, move the large end over the sides of the teeth in the arc of a circle, using the small end as a center. The file will dress down the sides of the teeth and properly joint them; but the machine will first have to be properly adjusted, so that its small end may have a bearing upon the saw-plate and its file end lie upon the teeth to dress them. This I accomplish by first setting thumb-screws $b$ so that their points may be in the same plane with the under surface of the file. Then by bearing the small end of the frame against the side of the saw-plate and screwing thumb-screw $a$ down I raise the small end of the frame and depress its large end, turning upon screw $b$ as a fulcrum, until the file is brought in contact with the sides of the teeth. In other words, using screw $b$ as a bearing or fulcrum, I can, by operating screw $a$, adjust the file end to the position desired; but because of the adjustment of the file end or change of inclination of the frame A it is obvious that the file itself will have to be adjusted to lie flat upon the teeth. This I accomplish by using screw $n$ at one end as a center upon which to rock the file or change its lateral inclination by means of the screws $m$ upon each side of the center at the other end. The handles enable me to hold the frame conveniently and the thumb screws adjust the machine with ease and accuracy.

The position of the guides or arms upon the clamp E need not of necessity be exactly as here shown; nor need the thumb-screws $e$ be set as I have them here. A change in these would not alter the clamping device essentially, which would still be made to hold the file between its arms and the projections upon the frame.

Having thus described my invention, what I claim as new, and desire to secure by Letters Patent, is—

1. In a machine for jointing the sides of the teeth of circular saws, the frame of which is A, the set-screw $a$ at its small end and set-screws $b$ in the frame, in combination with the file D, secured under the frame across the wide end, and the means for adjusting the inclination of said file, consisting of the thumb-screw $m$, impinging at one end of said file upon each side of its central line, and the thumb-screw $n$, impinging at its other end upon its central line, substantially as and for the purpose herein described.

2. In a machine for jointing the sides of the teeth of circular saws, the frame A, having a small end and a wide end, as shown, and having projections $c$ upon the under side of its wide end, in combination with the file D, and the means for holding said file, consisting of the clamping-bar E, with its upper guide-arms, $d$, and its lower arms, $d'$, and the thumb-screws $e$, substantially as herein described.

3. A machine for jointing the sides of the teeth of circular saws, consisting of the frame A, having a small end and a wide end, with handles B B', the adjusting thumb-screws $a$ and $b$, and the file D, with its clamp E and adjusting thumb-screws $m$ and $n$, substantially as herein described.

In witness whereof I hereto set my hand.

STEPHEN H. CHASE.

Witnesses:
J. E. RUCKER,
GEO. M. YOELL.